US012423231B2

(12) United States Patent
Bai et al.

(10) Patent No.: US 12,423,231 B2
(45) Date of Patent: Sep. 23, 2025

(54) CACHE MANAGEMENT METHOD, SOLID STATE DRIVE CONTROLLER AND SOLID STATE DRIVE

(71) Applicant: DapuStor Corporation, Shenzhen (CN)

(72) Inventors: Liang Bai, Shenzhen (CN); Yuanpeng Ma, Shenzhen (CN); Xiang Chen, Shenzhen (CN); Yafei Yang, Shenzhen (CN)

(73) Assignee: DAPUSTOR CORPORATION, Shenzhen (CN)

( * ) Notice: Subject to any disclaimer, the term of this patent is extended or adjusted under 35 U.S.C. 154(b) by 0 days.

(21) Appl. No.: 18/413,162

(22) Filed: Jan. 16, 2024

(65) Prior Publication Data

US 2024/0152454 A1 May 9, 2024

Related U.S. Application Data

(63) Continuation of application No. PCT/CN2022/091221, filed on May 6, 2022.

(30) Foreign Application Priority Data

Jul. 16, 2021 (CN) .......................... 202110808238.7

(51) Int. Cl.
*G06F 12/0802* (2016.01)
*G06F 3/06* (2006.01)
(Continued)

(52) U.S. Cl.
CPC ........ *G06F 12/0802* (2013.01); *G06F 3/0679* (2013.01); *G06F 12/0804* (2013.01);
(Continued)

(58) Field of Classification Search
CPC ............ G06F 12/0802; G06F 12/0804; G06F 12/0808; G06F 12/0815; G06F 12/0868; G06F 12/0871; G06F 12/0891
See application file for complete search history.

(56) References Cited

U.S. PATENT DOCUMENTS 10,810,123 B1 * 10/2020 Xu ....................... G06F 12/0804
11,003,580 B1 * 5/2021 Goss ................... G06F 12/0246
(Continued)

FOREIGN PATENT DOCUMENTS

| CN | 103136121 A | 6/2013 |
| CN | 103377152 A | 10/2013 |

(Continued)

OTHER PUBLICATIONS

International Search Report in related PCT Application No. PCT/CN2022/091221 dated Jul. 15, 2022 (10 pages).

*Primary Examiner* — Tracy A Warren
(74) *Attorney, Agent, or Firm* — BAYES PLLC

(57) ABSTRACT

A cache management method, a solid state drive controller, and a solid state drive are provided. The solid state drive comprises a cache space, and the cache space comprises a dirty data block linked list. The method comprises: obtaining a write command and generating a first dirty data block used to record data information of the write command; and if the first dirty data block conflicts in address range with a second dirty data block in the dirty data block linked list, marking data in the conflicting region of the second dirty data block as invalid and inserting the first dirty data block into the dirty data block linked list.

20 Claims, 6 Drawing Sheets

(51) Int. Cl.
*G06F 12/0804* (2016.01)
*G06F 12/0868* (2016.01)
*G06F 12/0871* (2016.01)

(52) U.S. Cl.
CPC ...... *G06F 12/0868* (2013.01); *G06F 12/0871* (2013.01); *G06F 2212/60* (2013.01); *G06F 2212/72* (2013.01)

(56) References Cited

U.S. PATENT DOCUMENTS

| | | | | |
|---|---|---|---|---|
| 2003/0212865 | A1* | 11/2003 | Hicken | G06F 12/0804 711/E12.04 |
| 2013/0111145 | A1* | 5/2013 | Ish | G06F 12/08 711/135 |
| 2015/0363285 | A1* | 12/2015 | Delaney | G06F 3/0619 714/6.12 |
| 2016/0004644 | A1* | 1/2016 | Samanta | G06F 11/1076 711/3 |
| 2016/0283379 | A1* | 9/2016 | Samanta | G06F 12/0804 |
| 2017/0177233 | A1 | 6/2017 | Delaney et al. | |
| 2021/0232322 | A1* | 7/2021 | Liang | G06F 3/0673 |
| 2021/0303480 | A1* | 9/2021 | Keller | G06F 12/0824 |
| 2022/0113900 | A1* | 4/2022 | Um | G06F 12/0804 |
| 2022/0138110 | A1* | 5/2022 | Dropps | G06F 12/0873 711/154 |

FOREIGN PATENT DOCUMENTS

| | | | |
|---|---|---|---|
| CN | 111563053 | A | 8/2020 |
| CN | 113626346 | A | 11/2021 |
| CN | 113655955 | A | 11/2021 |

\* cited by examiner

CACHE MANAGEMENT METHOD, SOLID STATE DRIVE CONTROLLER AND SOLID STATE DRIVE

CROSS-REFERENCE TO RELATED DISCLOSURES

The present application is a continuation of International Application No. PCT/CN2022/091221, filed on May 6, 2022, which claims the benefit of priority to Chinese Patent Application No. 202110808238.7 filed on Jul. 16, 2021. The entire contents of each of the above-referenced applications are expressly incorporated herein by reference.

TECHNICAL FIELD

The present disclosure relates to the technical field of solid state drives, and in particular to a cache management method, a solid state drive controller, and a solid state drive.

BACKGROUND

Solid state drives (SSDs) are hard drives made up of a solid state electronic storage chip array. SSDs comprise control units and storage units (FLASH storage chips or DRAM storage chips). Currently, a substantial portion of SSD systems incorporates dynamic random access memory (DRAM). Therefore, SSDs have a large data cache space for storing data.

Currently, in enterprise-level SSDs, a write-back mode is commonly employed to reduce delay and enhance performance. Part of the DRAM space in the SSD is allocated as a cache space to store data, and cache management records the address range and state of this portion of data. Typically, when a write command is sent by the host, the drive caches the data after receiving it from the host and then reports completion to the host. Due to the limited size of the cache space and its volatile nature, cache data must be flushed to NAND by the backend for persistence after certain conditions are met. The cache can only be freed once the data flushing process is completed.

Write conflicts arise when the address ranges of write data overlap, resulting in partial or complete replacement of old cache by new cache. When a partial replacement occurs, updated data is usually copied into the old cache space. In cases of complete replacement, the new cache can be inserted after the old cache is deleted. However, if the old cache data is in the process of being flushed, it cannot be updated immediately, as this would pose a risk of data inconsistency. The new cache can only be inserted after the flushing is completed. The data copying or waiting for flushing of the write command during the conflict resolution process increases the command processing delay and reduces the processing capacity of the host.

SUMMARY

Embodiments of the present disclosure provide a cache management method, a solid state drive controller, and a solid state drive, which address the technical problem of long business processing time in write conflict scenarios present in existing solid state drives, thereby reducing command delay in write conflict scenarios, and enhancing the system performance of solid state drives.

To solve the technical problem, embodiments of the present disclosure offer the following technical solutions:

In a first aspect, embodiments of the present disclosure provide a cache management method applicable to a solid state drive, wherein the solid state drive comprises a cache space, and the cache space comprises a dirty data block linked list; the method comprises: obtaining a write command and generating a first dirty data block, which is used to record data information of the write command; and if the first dirty data block conflicts in address range with a second dirty data block in the dirty data block linked list, marking data in the conflicting region of the second dirty data block as invalid and inserting the first dirty data block into the dirty data block linked list.

In some embodiments, the method further comprises:
if the first dirty data block conflicts in address range with the second dirty data block in the dirty data block linked list, further determining if the data in the conflicting region of the second dirty data block is in a flushing state;
if it is, inserting the first dirty data block into the dirty data block linked list, and updating data states of the first dirty data block and the second dirty data block upon the completion of data flushing in the conflicting region of the second dirty data block; and
if it is not, marking the data in the conflicting region of the second dirty data block as invalid and inserting the first dirty data block into the dirty data block linked list.

In some embodiments, the method further comprises:
if the data in the conflicting region of the second dirty data block is in a flushing state, further determining if data in the conflicting region is the same as data in a conflicting region of a third dirty data block in the dirty data block linked list;
if it is, marking the data in the conflicting region of the third dirty data block as invalid; and
if it is not, updating data states of the first dirty data block and the third dirty data block and inserting the first dirty data block into the dirty data block linked list.

In some embodiments, the method further comprises:
generating a bitmap collection for each dirty data block, wherein each bitmap collection comprises:
a flushable data bitmap used to identify data in the dirty data block that can be flushed to a flash memory;
a valid data bitmap used to identify valid data in the dirty data block;
a waiting-to-flush data bitmap used to identify data in the dirty data block that is waiting to be flushed to a flash memory;
a sent flush data bitmap used to identify data in the dirty data block that has been sent for flushing to a flash memory; and
a flush completion data bitmap used to identify data in the dirty data block that has completed flushing.

In some embodiments, the method further comprises.
before inserting the first dirty data block into the dirty data block linked list, setting data bits in the waiting-to-flush data bitmap of the first dirty data block corresponding to the data in the conflicting region to 1;
wherein updating the data states of the first dirty data block and the second dirty data block upon the completion of data flushing in the conflicting region of the second dirty data block, comprises:
setting data bits in the flush completion data bitmap of the second dirty data block corresponding to the data in the conflicting region to 1;
setting data bits in the waiting-to-flush data bitmap of the first dirty data block corresponding to the data in the conflicting region to 0; and setting data bits in the flushable data bitmap of the first dirty data block corresponding to the data in the conflicting region to 1.

In some embodiments, marking the data in the conflicting region of the second dirty data block as invalid, comprises: setting data bits in the valid data bitmap of the second dirty data block corresponding to the data in the conflicting region to 0.

In some embodiments, updating the data states of the first dirty data block and the third dirty data block, comprises:
setting data bits in the waiting-to-flush data bitmap of the third dirty data block corresponding to the data in the conflicting region to 0, and simultaneously setting data bits in the valid data bitmap of the third dirty data block corresponding to the data in the conflicting region to 0; and
setting data bits in the waiting-to-flush data bitmap of the first dirty data block corresponding to the data in the conflicting region to 1.

In some embodiments, the method further comprises:
generating a first conflict flag and a second conflict flag for each dirty data block, wherein the first conflict flag is used to mark whether the dirty data block conflicts in address range with an old dirty data block, and the second conflict flag is used to mark whether the dirty data block conflicts in address range with a new dirty data block; and
if the first dirty data block conflicts in address range with the second dirty data block in the dirty data block linked list, setting the first conflict flag corresponding to the first dirty data block to 1, and setting the second conflict flag corresponding to the second dirty data block to 1.

In a second aspect, embodiments of the present disclosure provide a solid state drive controller applicable to a solid state drive, wherein the solid state drive comprises at least one flash medium; the solid state drive controller is used to execute the cache management method according to the first aspect.

In a third aspect, embodiments of the present disclosure provide a solid state drive, comprising:
the solid state drive controller according to the second aspect; and
at least one flash medium in communication connection with the solid state drive controller.

In a fourth aspect, embodiments of the present disclosure further provide a non-volatile computer-readable storage medium, wherein the computer-readable storage medium stores computer-executable instructions, which are used to enable the solid state drive to execute the cache management method as described above.

The beneficial effects of the embodiments of the present disclosure are as follows: In contrast to the prior art, the cache management method according to the embodiments of the present disclosure is applicable to a solid state drive. The solid state drive comprises a cache space, and the cache space comprises a dirty data block linked list. The method comprises: obtaining a write command and generating a first dirty data block, which is used to record data information of the write command; and if the first dirty data block conflicts in address range with a second dirty data block in the dirty data block linked list, marking the data in the conflicting region of the second dirty data block as invalid and inserting the first dirty data block into the dirty data block linked list. When the first dirty data block conflicts in address range with the second dirty data block in the dirty data block linked list, the data in the conflicting region of the second dirty data block is marked as invalid, and the first dirty data block is inserted into the dirty data block linked list. In this way, the present disclosure can separate cache insertion from data updates, allowing for rapid cache insertion, reducing command delay in write conflict scenarios, and enhancing the system performance of the solid state drive.

BRIEF DESCRIPTION OF DRAWINGS

One or more embodiments are exemplified through images in the corresponding accompanying drawings. These exemplary illustrations do not impose limitations on the embodiments. Elements in the accompanying drawings with the same reference number are indicated to be similar elements, unless specifically stated otherwise. The images in the accompanying drawings are not to be construed as limiting in scale.

DETAILED DESCRIPTION

To make the objectives, technical solutions, and advantages of the embodiments in the present disclosure clearer, the following will provide a description of the technical solutions in the embodiments of the present disclosure, in conjunction with the accompanying drawings. Clearly, the described embodiments are part of the embodiments in the present disclosure, and not the entirety of them. Based on the embodiments in the present disclosure, all other embodiments obtained by those of ordinary skill in the art without creative work shall fall within the protection scope of the present disclosure.

Furthermore, the technical features involved in the various embodiments of the present disclosure described below can be combined with each other as long as they do not conflict.

Typical solid state drives (SSDs) usually comprise a solid state drive controller (main controller), flash array, cache unit, and other peripheral units.

The solid state drive controller serves as the control processing unit, managing the internal system of the SSD. The flash array (NAND Flash), serving as the storage unit, is configured to store data which includes user data and system data. The flash array generally has multiple channels (CH), with each channel independently connecting a set of NAND Flash, such as CH0/CH1 . . . CHx. NAND Flash, as a characteristic, requires erasure before writing, and each NAND Flash has a limited number of erase cycles. The cache unit is configured to cache mapping tables and is generally a dynamic random access memory (DRAM). Other peripheral units may comprise sensors, registers, and other components.

Figure 1:
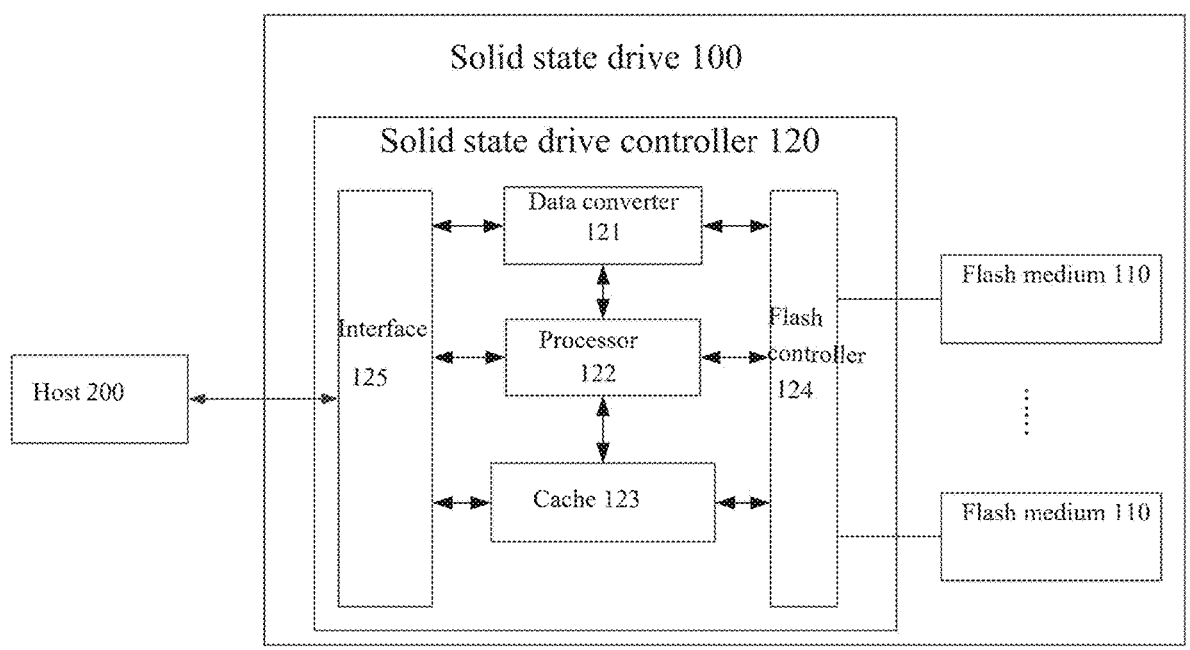
FIG. 1 is a schematic structural diagram of a solid state drive disclosed according to the embodiments of the present disclosure.

FIG. 1 is a schematic structural diagram of a solid state drive disclosed according to the embodiments of the present disclosure.

As shown in FIG. 1, the solid state drive 100 comprises a flash medium 110 and a solid state drive controller 120 connected to the flash medium 110. The solid state drive 100 is in communication connection with the host 200 through wired or wireless means to achieve data exchange.

The flash medium 110, serving as the storage medium of the solid state drive 100, is also known as flash memory, Flash, Flash storage, or flash chips. It belongs to a type of memory device and is a non-volatile memory that can retain data for extended periods even without a power supply. The storage characteristics of the flash medium 110 are similar to hard drives, making it the foundation of the storage medium in various portable digital devices.

The flash medium 110 can be Nand Flash, which uses a single transistor as a storage unit for binary signals, and has a structure very similar to that of a regular semiconductor transistor. The Nand FLASH differs in that the single transistor thereof incorporates a floating gate and control gate. The floating gate is configured to store electrons, and it is covered by a layer of silicon dioxide insulator. The floating gate is coupled to the control gate via a capacitor. When negative electrons are injected into the floating gate under the influence of the control gate, the storage state of the single transistor in Nand Flash changes from "1" to "0". When the negative electrons are removed from the floating gate, the storage state changes from "0" to "1". The insulator covering the surface of the floating gate traps the negative electrons in the floating gate, enabling data storage. In other words, the storage unit in Nand Flash is a floating-gate transistor that stores data in the form of an electric charge. The amount of stored electric charge depends on the magnitude of the voltage applied to the floating-gate transistor.

A Nand FLASH comprises at least one chip, and each chip consists of several physical blocks, with each physical block comprising several pages. A physical block is the smallest unit for erasing operations in Nand FLASH, and a page is the smallest unit for read and write operations in Nand FLASH. The capacity of a Nand FLASH is equal to the number of physical blocks multiplied by the number of pages contained in one physical block and the capacity of an individual page. The flash medium 10 can be categorized into SLC, MLC, TLC, and QLC based on different voltage levels of storage units.

The solid state drive controller 120 comprises a data converter 121, a processor 122, a cache 123, a flash controller 124, and an interface 125.

The data converter 121 is connected to both the processor 122 and the flash controller 124. The data converter 121 is configured to convert binary data to hexadecimal data and vice versa. In some embodiments, when the flash controller 124 writes data to the flash medium 110, it converts the binary data to be written to hexadecimal data using the data converter 121 and then writes the data to the flash medium 110. When the flash controller 124 reads data from the flash medium 110, it converts the hexadecimal data stored in the flash medium 110 to binary data using the data converter 121, and then reads the converted data from the binary data page register. The data converter 121 may comprise a binary data register and a hexadecimal data register. The binary data register may be configured to store data converted from hexadecimal to binary, and the hexadecimal data register may be configured to store data converted from binary to hexadecimal.

The processor 122 is connected to the data converter 121, the cache 123, the flash controller 124, and the interface 125, respectively. The processor 122 can be connected to the data converter 121, the cache 123, the flash controller 124, and the interface 125 through a bus or other means. The processor is configured to run non-volatile software programs, instructions, and modules stored in the cache 123 to implement any one of the method embodiments in the present disclosure.

The cache 123 is configured primarily to cache read/write instructions sent by the host 200 and the read or write data obtained from the flash medium 110 based on the read/write instructions sent by the host 200. The cache 123, serving as a non-volatile computer-readable storage medium, can be configured to store non-volatile software programs, non-volatile computer-executable programs, and modules. The cache 123 may comprise a program storage area where an operating system and at least one disclosure needed for functionality can be stored. Furthermore, the cache 123 may comprise a high-speed random access memory, and may further comprise a non-volatile memory, such as at least one magnetic disk memory device, flash memory device, or other non-volatile solid state memory device. In some embodiments, the cache 123 comprises a memory that is remotely configured relative to the processor 122. Examples of the above network include, but are not limited to, the Internet, intranets, local area networks, mobile communication networks, and combinations thereof. The cache 123 may be a static random access memory (SRAM), a tightly coupled memory (TCM), or a double data rate synchronous dynamic random access memory (DDR SRAM).

The flash controller 124 is connected to the flash medium 110, the data converter 121, the processor 122, and the cache 123. The flash controller is configured to access the back-end flash medium 110 and manage various parameters and data I/O of the flash medium 110; or to provide access interfaces and protocols, implement the corresponding SAS/SATA target protocol end or NVMe protocol end, obtain I/O instructions sent by the host 200, and decode and generate internal private data results for execution; or to be responsible for the core processing of flash translation layer (FTL).

The interface 125 is connected to the host 200, the data converter 121, the processor 122, and the cache 123. The interface is configured to receive data sent by the host 200 or data sent by the processor 122, implementing data transmission between the host 200 and the processor 122. The interface 125 may be in the form of SATA-2 interface, SATA-3 interface, SAS interface, MSATA interface, PCI-E interface, NGFF interface, CFast interface, SFF-8639 interface, and M.2 NVME/SATA protocols.

Figure 2:
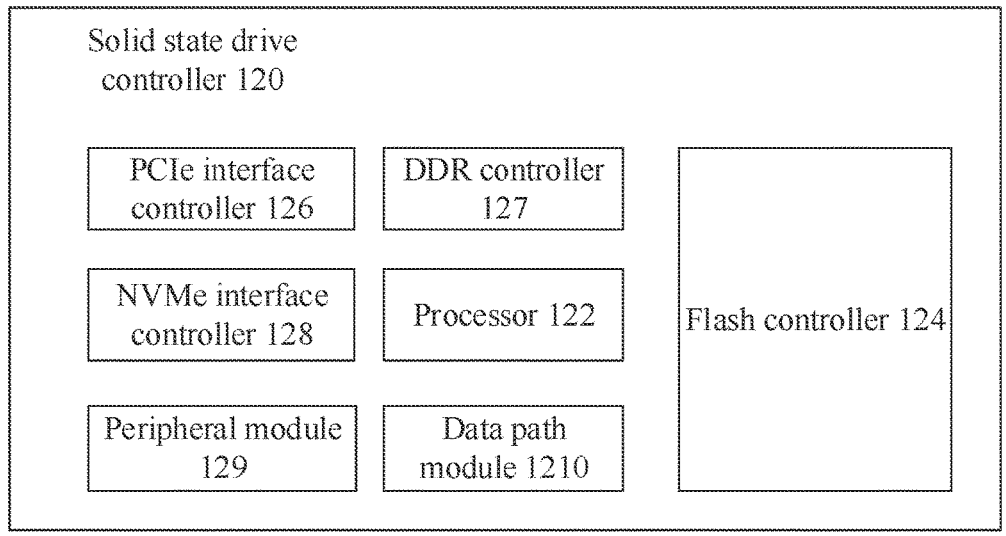
FIG. 2 is a schematic diagram of a solid state drive controller disclosed according to the embodiments of the present disclosure.

FIG. 2 is a schematic structural diagram of a solid state drive controller disclosed according to the embodiments of the present disclosure, wherein the solid state drive controller belongs to the solid state drive as mentioned above.

As shown in FIG. 2, the solid state drive controller comprises a PCIe interface controller 126, a DDR controller 127, an NVMe interface controller 128, a processor 122, a peripheral module 129, a data path module 1210, and a flash controller 124.

In some embodiments, the PCIe interface controller 126 is configured to control PCIe communication protocols, the DDR controller 127 is configured to control the dynamic random access memory, the NVMe interface controller 128 is configured to control NVMe communication protocols, the peripheral module 129 is configured to control other relevant communication protocols, the data path module 1210 is configured to control data paths, such as write cache management, and the flash controller 124 is configured for flash data processing.

This solid state drive controller 120 further comprises a data converter 121, a cache 123, an interface 125, etc.

In some embodiments, the data converter 121 is connected to both the processor and the flash controller. The data converter is configured to convert binary data to hexadecimal data and vice versa. In some embodiments, when the flash controller writes data to the flash medium, it converts the binary data to be written to hexadecimal data using the data converter and then writes the data to the flash medium. When the flash controller reads data from the flash medium, it converts the hexadecimal data stored in the flash medium to binary data using the data converter, and then reads the converted data from the binary data page register. The data converter may comprise a binary data register and a hexadecimal data register. The binary data register may be configured to store data converted from hexadecimal to binary, and the hexadecimal data register may be configured to store data converted from binary to hexadecimal.

In some embodiments, the processor 122 is connected to the data converter 121, the cache 123, the flash controller 124, and the interface 125, respectively. The processor can be connected to the data converter, the cache, the flash controller, and the interface through a bus or other means. The processor is configured to run non-volatile software programs, instructions, and modules stored in the cache to implement any one of the method embodiments in the present disclosure.

In some embodiments, the cache 123 is primarily used to cache the read/write instructions sent by the host and the read data or write data obtained from the flash medium based on the read/write instructions sent by the host. The cache, serving as a non-volatile computer-readable storage medium, can be configured to store non-volatile software programs, non-volatile computer-executable programs, and modules. The cache may comprise a program storage area where an operating system and at least one disclosure needed for functionality can be stored. Furthermore, the cache may comprise a high-speed random access memory, and may further comprise a non-volatile memory, such as at least one magnetic disk memory device, flash memory device, or other non-volatile solid state memory device. In some embodiments, the cache comprises a memory that is remotely configured relative to the processor. Examples of the above network include, but are not limited to, the Internet, intranets, local area networks, mobile communication networks, and combinations thereof. The cache 123 may be a static random access memory (SRAM), a tightly coupled memory (TCM), or a double data rate synchronous dynamic random access memory (DDR SRAM).

In some embodiments, the flash controller 124 is connected to the flash medium 110, the data converter 121, the processor 122, and the cache 123. The flash controller is configured to access the back-end flash medium and manage various parameters and data I/O of the flash medium; or to provide access interfaces and protocols, implement the corresponding SAS/SATA target protocol end or NVMe protocol end, obtain I/O instructions sent by the host, and decode and generate internal private data results for execution; or to be responsible for the core processing of flash translation layer (FTL).

In some embodiments, the interface 125 is connected to the host 200, the data converter 121, the processor 122, and the cache 123. The interface is configured to receive data sent by the host or data sent by the processor, implementing data transmission between the host and the processor. The interface may be in the form of a SATA-2 interface, SATA-3 interface, SAS interface, MSATA interface, PCI-E interface, NGFF interface, CFast interface, SFF-8639 interface, and M.2 NVME/SATA protocols.

Currently, in enterprise-level SSDs, a write-back mode is commonly employed to reduce delay and enhance performance. Part of the DRAM space in the SSD is allocated as a cache space to store data, and cache management records the address range and state of this portion of data. Typically, when a write command is sent by the host, the drive caches the data after receiving it from the host and then reports completion to the host. Due to the limited size of the cache space and its volatile nature, cache data must be flushed to NAND by the backend for persistence after certain conditions are met. The cache can only be freed once the data flushing process is completed.

Figure 3:
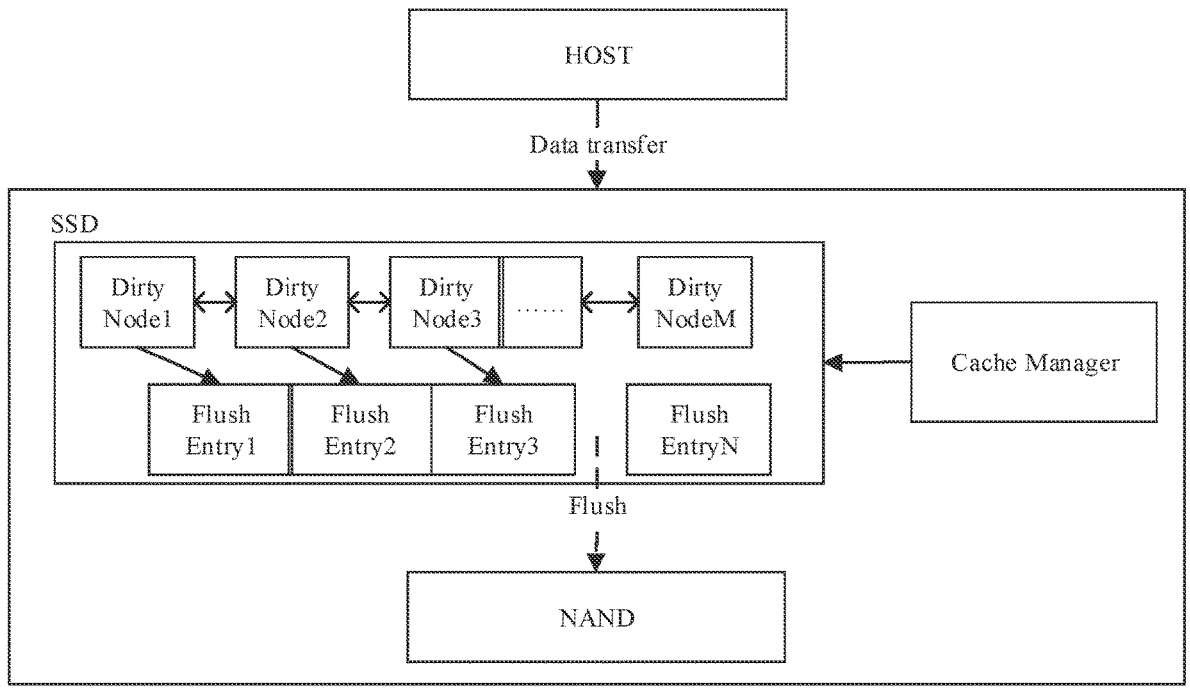
FIG. 3 is a schematic diagram of a cache management framework for a solid state drive disclosed according to the embodiments of the present disclosure.

FIG. 3 is a schematic diagram of a cache management framework for a solid state drive disclosed according to the embodiments of the present disclosure.

In Write-Back mode, data is only written to the cache when it is updated. Modified cache data is only written to the back-end storage when it is replaced from the cache. The advantage of this mode is fast data write speed, as there is no need to write to storage. However, the disadvantage is that if a power failure occurs before the updated data is written to storage, the data cannot be retrieved.

As shown in FIG. 3, the data cache space in the SSD is typically managed by the cache manager module of the firmware. The cache manager module is primarily responsible for cache allocation, insertion, lookup, flushing, and release. The data in the cache is organized in the form of a dirty data block (DirtyNode) linked list. Generally, a dirty data block (DirtyNode) records information of written data, including logical media address (LMA), data length, data address, and the current flush position. Before data transmission for a write command commences, the Cache Manager allocates cache space for the command. After the data transfer is completed, the dirty data block (DirtyNode) is inserted into the dirty data block linked list. Each DirtyNode generates a corresponding flush entry that is added to the flush queue. When the cache data reaches a certain threshold, the CacheManager selects a certain amount of Flush Entries from the flush queue to flush to the NAND. After the data flush is completed, the dirty data block and the corresponding cache space can be released.

The existing cache management technology operates at the level of dirty data blocks. Updating the cache essentially involves the process of inserting dirty data blocks into the dirty data block linked list. If a new dirty data block conflicts in address range with a certain dirty data block in the dirty data block linked list, it becomes impossible to differentiate the new and old data in the conflicting part after inserting the new dirty data block directly into the dirty data block linked list. As a result, the cache can only store the most recent data.

Therefore, new and old dirty data blocks cannot coexist on the linked list within the cache. The insertion of new dirty data blocks is dependent on the overall state of the old dirty data blocks, and conflict handling is time-consuming. In scenarios with a large number of write conflicts, the average command delay is increased, leading to slower service processing speeds.

Based on this, a cache management method according to the embodiments of the present disclosure is provided to reduce command delay in write conflict scenarios, thereby enhancing the system performance of solid state drives. The specific technical solutions in the present disclosure are explained below in conjunction with the accompanying drawings in the specification.

Figure 4:
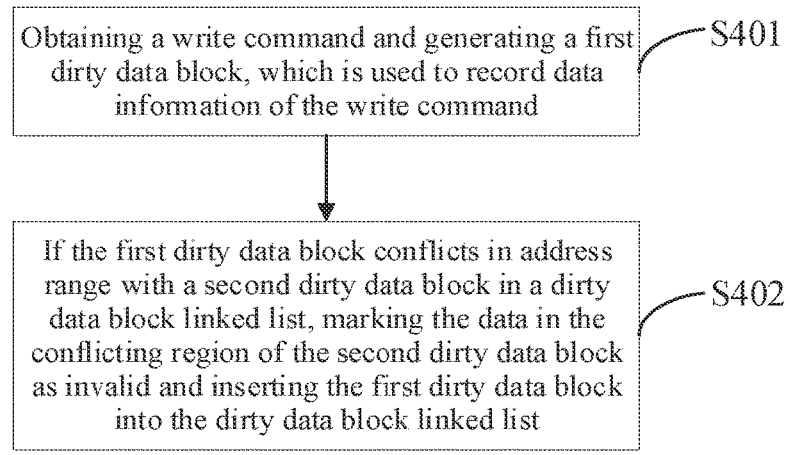
FIG. 4 is a flowchart of a cache management method disclosed according to the embodiments of the present disclosure.

FIG. 4 is a flowchart of a cache management method disclosed according to the embodiments of the present disclosure.

As shown in FIG. 4, the cache management method comprises:

S401: Obtain a write command and generate a first dirty data block, which is used to record data information of the write command.

In some embodiments, the solid state drive obtains a write command, and the cache manager module generates the first dirty data block based on the write command. The first dirty data block is used to record data information of the write command, including the logical media address (LMA), data length, data address, and the current flush position.

S402: If the first dirty data block conflicts in address range with a second dirty data block in a dirty data block linked list, mark the data in the conflicting region of the second dirty data block as invalid and insert the first dirty data block into the dirty data block linked list.

It can be understood that generally, the dirty data blocks within the cache space are independent of each other, that is, there is no overlap in address ranges among different dirty data blocks. This prevents conflicts between different dirty data blocks. Obviously, if there is no address range conflict between the first dirty data block and any of the dirty data blocks in the dirty data block linked list, the first dirty data block is directly inserted into the dirty data block linked list. Additionally, a flush entry is generated and added to the flush queue, preparing for data flushing, which completes the cache update.

In some embodiments, within the cache space, dirty data blocks are organized and managed in the form of a dirty data block linked list. The dirty data blocks in the dirty data block linked list do not overlap in their address ranges. At this point, if there is an address range conflict between the logical address in the first dirty data block and the second dirty data block in the dirty data block linked list, it is necessary to handle the data in the conflicting region to resolve the conflict between the two dirty data blocks.

In the embodiments of the present disclosure, the management granularity for data in the solid state drive is 4 KB. For illustrative purposes, the data region for each dirty data block is identified as [SLBA, ELBA], where SLBA stands for Start LBA, i.e., the logical address of the starting position, and ELBA stands for End LBA, i.e., the logical address of the ending position. Therefore, the data length is (ELBA-SLBA).

Figure 5:
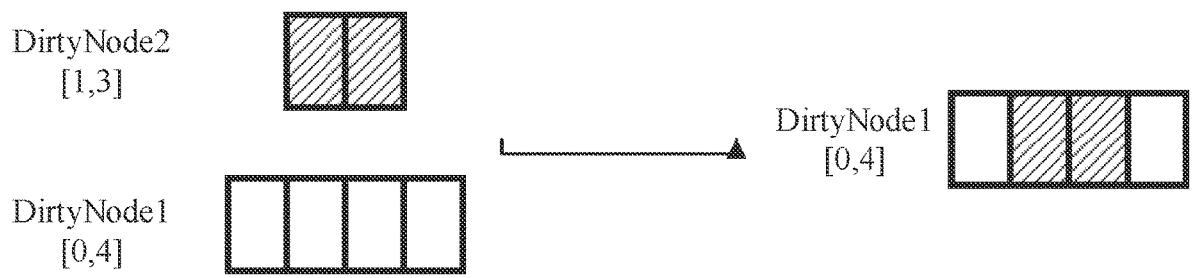
FIG. 5 is a schematic diagram of a scenario for resolving data copy conflicts disclosed according to the embodiments of the present disclosure.

FIG. 5 is a schematic diagram of a scenario for resolving data copy conflicts disclosed according to the embodiments of the present disclosure.

As shown in FIG. 5, the data region of the first dirty data block (DirtyNode1) is [0,4], and the data region of the second dirty data block (DirtyNode2) is [1,3]. Assume that the host sends a write IO[1] to generate the first dirty data block DirtyNode1[0,4] and inserts it into the cache first, and then the host sends a write IO[2] to generate the second dirty data block DirtyNode2[1,3]. Afterwards, a conflict with the first dirty data block (DirtyNode1) is detected. At this point, it is necessary to copy the data from the second dirty data block (DirtyNode2) into the address space of the first dirty data block (DirtyNode1) to resolve the conflict. Therefore, during a write conflict, cache updates may involve a data copying process that consumes a significant amount of CPU time, leading to command scheduling blockage and delayed command processing.

Figure 6:
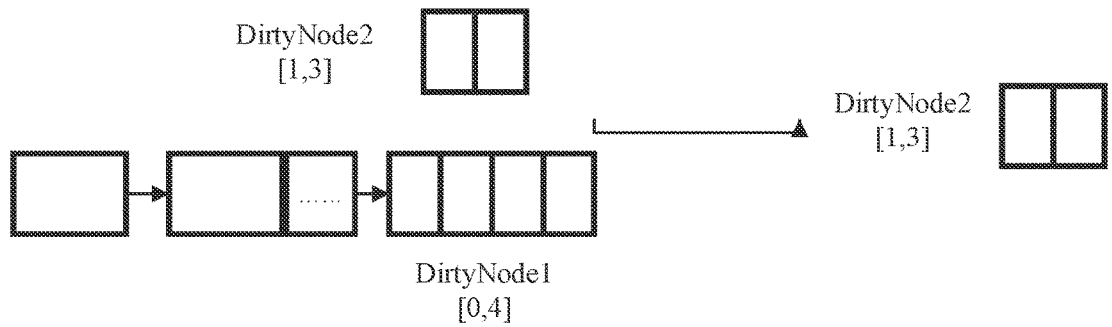
FIG. 6 is a schematic diagram of a scenario for resolving conflicts while waiting for the flushing disclosed according to the embodiments of the present disclosure.

FIG. 6 is a schematic diagram of a scenario for resolving conflicts while waiting for the flushing disclosed according to the embodiments of the present disclosure.

As shown in FIG. 6, assume that the first dirty data block (DirtyNode1) sent by the host is being flushed to the NAND. At this point, the generated second dirty data block (DirtyNode2) cannot be immediately inserted into the cache space. It must wait for the flushing process to finish before it can be inserted into the cache space. Therefore, during a write conflict, if the old cache is currently being flushed, the new cache needs to wait for the flushing to finish before it can complete the update process. This waiting process increases the command processing time.

Based on the above, the present disclosure separates the insertion of dirty data blocks from data updates by determining whether the first dirty data block conflicts in address range with the second dirty data block in the dirty data block linked list. If the first dirty data block conflicts in address range with the second dirty data block in the dirty data block linked list, the data in the conflicting region of the second dirty data block is marked as invalid. This separation facilitates the rapid insertion of dirty data blocks into the cache, that is, facilitates the rapid insertion of the first dirty data block into the dirty data block linked list.

It can be understood that, regardless of the state of this portion of old data, i.e. the state of the old data corresponding to the second dirty data block, the old data can either be directly discarded or overwritten by the new data. The new dirty data block, i.e. the other part of the first dirty data block without conflicts, can be updated normally. Although there are both old and new data in the cache space for the same address range, the old data is marked as "invalid". When there is a need to read data from this address range, the cache manager module can always retrieve the most recent data. This ensures data consistency.

In the embodiments of the present disclosure, after marking the data in the conflicting region of the second dirty data block as invalid, the first dirty data block is inserted into the dirty data block linked list. At this point, since the data in the conflicting region of the second dirty data block has been invalidated, the first dirty data block can be inserted into the dirty data block linked list without causing conflicts. Additionally, when there is a need to read data from the address range in the conflicting region, the cache manager module can obtain the most recent data, thereby ensuring data consistency.

Further, if the data in the conflicting region is in a flushing state, additional processing is required for cache data updates caused by flushing.

Figure 7:
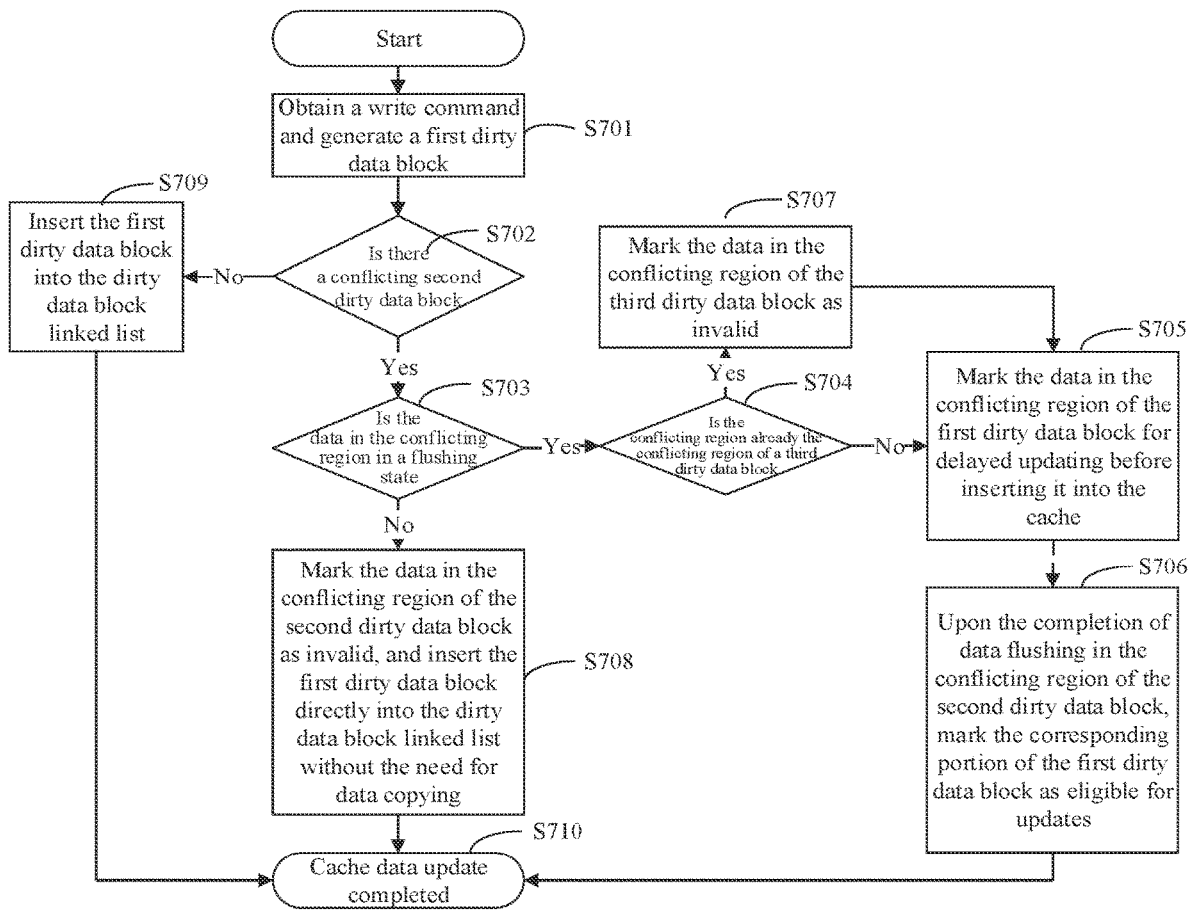
FIG. 7 is a schematic diagram of the overall process of a cache management method disclosed according to the embodiments of the present disclosure.

FIG. 7 is a schematic diagram of the overall process of a cache management method disclosed according to the embodiments of the present disclosure.

As shown in FIG. 7, the overall process of the cache management method comprises:

S701: Obtain a write command and generate a first dirty data block.

S702: Is there a conflicting second dirty data block?

In some embodiments, determine if the first dirty data block conflicts in address range with a second dirty data block in the dirty data block linked list, the second dirty data block being any of the dirty data blocks in the dirty data block linked list. If there is a conflicting second dirty data block, proceed to S703: Is the data in the conflicting region in a flushing state? If there is no conflicting second dirty data block, proceed to step S709: Insert the first dirty data block into the dirty data block linked list.

S703: Is the data in the conflicting region in a flushing state?

In some embodiments, determine if the data in the conflicting region of the first dirty data block and the second dirty data block is in a flushing state. If it is, insert the first dirty data block into the dirty data block linked list, and upon the completion of data flushing in the conflicting area of the second dirty data block, update the data states of the first dirty data block and the second dirty data block.

Further, if the data in the conflicting region of the first dirty data block and the second dirty data block is in a flushing state, proceed to S704: Is the conflicting region already the conflicting region of a third dirty data block? If it is not, proceed to S708: Mark the data in the conflicting region of the second dirty data block as "invalid", and insert the first dirty data block directly into the dirty data block linked list without the need for data copying.

S704: Is the conflicting region already the conflicting region of a third dirty data block?

In some embodiments, determine if the conflicting region of the first dirty data block and the second dirty data block is already the conflicting region of another dirty data block in the dirty data block linked list, assuming this other dirty data block is the third dirty data block. If it is, proceed to S707: Mark the data in the conflicting region of the third dirty data block as invalid. If it is not, proceed to step S708.

S705: Mark the data in the conflicting region of the first dirty data block for delayed updating before inserting it into the cache.

It can be understood that because the data in the conflicting region is currently being flushed, the new dirty data block, which is the portion of data in the first dirty data block, cannot be updated immediately. Therefore, the portion needs to be marked for delayed updating. Once marked, the first dirty data block can be inserted into the cache, that is, the first dirty data block is inserted into the dirty data block linked list. At this point, the cache contains new and old conflicting data. The new data can only be updated after the old data has been flushed and removed, that is, the data in the first dirty data block can only be updated after the flushing process of the data in the second dirty data block is completed.

In some embodiments, after determining that the conflicting area is not the conflicting region of the third dirty data block, update the data state of the first dirty data block and the third dirty data block, which comprises:

setting the data bits in the waiting-to-flush data bitmap of the third dirty data block corresponding to the data in the conflicting region to 0, and simultaneously setting the data bits in the valid data bitmap of the third dirty data block corresponding to the data in the conflicting region to 0; and setting the data bits in the waiting-to-flush data bitmap of the first dirty data block corresponding to the data in the conflicting region to 1.

S706: Upon the completion of data flushing in the conflicting region of the second dirty data block, mark the corresponding portion of the first dirty data block as eligible for updates.

In some embodiments, insert the first dirty data block into the dirty data block linked list, and upon the completion of data flushing in the conflicting region of the second dirty data block, update the data states of the first dirty data block and the second dirty data block.

In the case of a flushing conflict, the new dirty data block, that is, the first dirty data block, can also be directly inserted into the dirty data block linked list without waiting for the completion of the flushing. Since the old conflicting data cannot be immediately removed in this case, both the new and old data coexist in the cache. Within the new dirty data block, i.e., the first dirty data block, this portion of conflicting data will be marked as the most recent.

In some embodiments, the method further comprises: generating a bitmap collection for each dirty data block (DirtyNode), that is, managing the state of data in each dirty data block using a set of bitmaps. Each 1 bit in the bitmap represents a unit data at the corresponding position, and one bitmap represents a collection of unit data. For convenience of describing the principle, assuming the maximum IO size supported by the solid state drive is 128 KB, the bitmap is generated based on the relative position of the address range of the dirty data block within the 128 KB. For example, the flushable data bitmap (DirtyBitmap) is defined as BIT_MASK(LEN)<<(SLBA %32).

In some embodiments, the BIT_MASK operation is performed on LEN, where BIT_MASK(LEN) is used to generate a sequence of "1" bits with a length of LEN. For example: BIT_MASK(6) is 0b111111. Each 1 bit represents 4 KB data, and BIT_MASK(LEN) represents data with a length of LEN.

It can be understood that with a unit data granularity of 4 KB and a maximum IO size of 128 KB, 32 bits are required to represent the data state of this IO. To allow the bitmap to represent the relative position of its data within 128K data, a left shift is performed, where (SLBA %32) represents the leftward shift.

In the embodiments of the present disclosure, when searching for a particular dirty data block in the cache, the system first finds which 128K data the dirty data block belongs to and then queries the bitmap in that 128K data.

In the embodiments of the present disclosure, a Bitmap collection comprises a plurality of bitmaps, that is, each bitmap collection comprises:

A flushable data bitmap (DirtyBitmap): The DirtyBitmap is used to identify data in the dirty data block that can be flushed to the flash memory. In some embodiments, data in DirtyNode that can be flushed to the NAND is identified, and a bit value of 1 represents the flushable state. There may be discontinuous bit segments in the Bitmap, so the data in the DirtyNode may need to be flushed multiple times. The corresponding bit segments are cleared to 0 after the data is flushed. A DirtyBitmap value of 0 does not necessarily indicate that all the data in the DirtyNode has been flushed. The waiting-to-flush data bitmap (PendingBitmap) needs to be considered. In the embodiments of the present disclosure, the initial value of the waiting-to-flush data bitmap (PendingBitmap) is LEN<<(SLBA %32).

A valid data bitmap (ValidBitmap): The ValidBitmap is used to identify the valid data in the dirty data block. In some embodiments, it is used to identify the valid data in the DirtyNode. When data is "invalidated", the corresponding bits need to be cleared to 0. The Bitmap needs to be checked when a read hits the cache. Its initial value is the same as DirtyBitmap. For example, if the address range of the dirty data block DirtyNodeA is [0,4], its initial valid data bitmap (ValidBitmap) is 0b1111. Assuming there is a new dirty data block DirtyNodeB[2,4], the initial ValidBitmap of DirtyNodeB is 0b1100. Since DirtyNodeA and DirtyNodeB have a conflicting region of [2,4], and DirtyNodeB is newer than DirtyNodeA, the valid data in DirtyNodeA decreases, and the ValidBitmap of DirtyNodeA is updated to 0b11.

A waiting-to-flush data bitmap (PendingBitmap): The PendingBitmap is used to identify the data in the dirty data block that is waiting to be flushed to the flash memory. In some embodiments, it is used to identify the data in the DirtyNode pending for flushing. Generally, when a write conflict occurs, old data is being flushed, and the data of the new dirty data block DirtyNode in the conflicting range needs to delay its update to the cache. After the old data is flushed, the PendingBitmap clears the corresponding bit segments to 0 based on the flushed data and updates the DirtyBitmap.

A sent flush data bitmap (SentBitmap): The SentBitmap is used to identify the data in the dirty data block that has been sent for flushing to the flash memory. In some embodiments, it is used to identify the data in the DirtyNode that has been sent for flushing. This bitmap represents data currently being flushed to the NAND and data that has already been flushed, and thus it is used to assist in updating the flushable data bitmap (DirtyBitmap).

A flush completion data bitmap (DoneBitmap): The DoneBitmap is used to identify the data in the dirty data block that has completed flushing. In some embodiments, it is used to identify the data in the DirtyNode that has been flushed. Generally, the DoneBitmap works in conjunction with the sent flush data bitmap (SentBitmap) to calculate the currently flushing data, that is, the currently flushing data=SentBitmap−DoneBitmap.

In the embodiments of the present disclosure, the method further comprises:
before inserting the first dirty data block into the dirty data block linked list, setting data bits in the waiting-to-flush data bitmap of the first dirty data block corresponding to the data in the conflicting region to 1;
wherein updating the data states of the first dirty data block and the second dirty data block upon the completion of data flushing in the conflicting region of the second dirty data block, comprises:
setting data bits in the flush completion data bitmap of the second dirty data block corresponding to the data in the conflicting region to 1;
setting data bits in the waiting-to-flush data bitmap of the first dirty data block corresponding to the data in the conflicting region to 0; and
setting data bits in the flushable data bitmap of the first dirty data block corresponding to the data in the conflicting region to 1.

In the embodiments of the present disclosure, the valid data bitmap is used to identify the valid data in the dirty data block. Hence, marking data in the conflicting region of a certain dirty data block as invalid means setting the data bits in the valid data bitmap of the dirty data block corresponding to the data in the conflicting region to 0, i.e., clearing the corresponding bits to 0 to mark the data as invalid. For example, marking the data in the conflicting region of the second dirty data block as invalid comprises: setting the data bits in the valid data bitmap of the second dirty data block corresponding to the data in the conflicting region to 0; or marking the data in the conflicting region of the third dirty data block as invalid comprises: setting the data bits in the valid data bitmap of the third dirty data block corresponding to the data in the conflicting region to 0.

In the embodiments of the present disclosure, due to the setting of a bitmap collection, the solid state drive can update the state of data in DirtyNode by performing rapid operations on the bitmap, such as binary AND or OR operations. It can be understood that the bitmap collection is only used during write conflicts, which helps to reduce the computation of the IO path and enhance system performance.

S707: Mark the data in the conflicting region of the third dirty data block as invalid.

In some embodiments, setting the data bits in the valid data bitmap of the third dirty data block corresponding to the data in the conflicting region to 0.

S708: Mark the data in the conflicting region of the second dirty data block as invalid, and insert the first dirty data block directly into the dirty data block linked list without the need for data copying.

In some embodiments, set the data bits in the valid data bitmap of the second dirty data block corresponding to the data in the conflicting region to 0. Additionally, as data in the conflicting region is not in a flushing state, the first dirty data block is inserted directly into the dirty data block linked list without the need for data copying.

S709: Insert the first dirty data block into the dirty data block linked list.

In some embodiments, if there is no address range conflict with a second dirty data block in the dirty data block linked list, the first dirty data block is directly inserted into the dirty data block linked list.

S710: Cache data update completed.

In the embodiments of the present disclosure, to determine the existence of conflicts, the method further comprises:
generating a first conflict flag and a second conflict flag for each dirty data block, wherein the first conflict flag is used to mark whether the dirty data block conflicts in address range with an old dirty data block, and the second conflict flag is used to mark whether the dirty data block conflicts in address range with a new dirty data block; and
if the first dirty data block conflicts in address range with the second dirty data block in the dirty data block linked list, setting the first conflict flag corresponding to the first dirty data block to 1, and setting the second conflict flag corresponding to the second dirty data block to 1.

For example, the first conflict flag (hasOldOverlap) and the second conflict flag (hasNewOverlap) mark the conflict situation in DirtyNode, wherein the first conflict flag is used to mark whether the dirty data block conflicts in address range with an old dirty data block, and the second conflict flag is used to mark whether the dirty data block conflicts in address range with a new dirty data block. For example, in case of a conflict, the hasOldOverlap flag of the new dirty data block DirtyNode is set to 1, and the hasNewOverlap flag of the old dirty data block DirtyNode is set to 1. If both the hasOldOverlap and hasNewOverlap flags of a dirty data block DirtyNode are 0, it indicates that the dirty data block DirtyNode has not encountered conflicts with other dirty data blocks DirtyNode.

Figure 8:
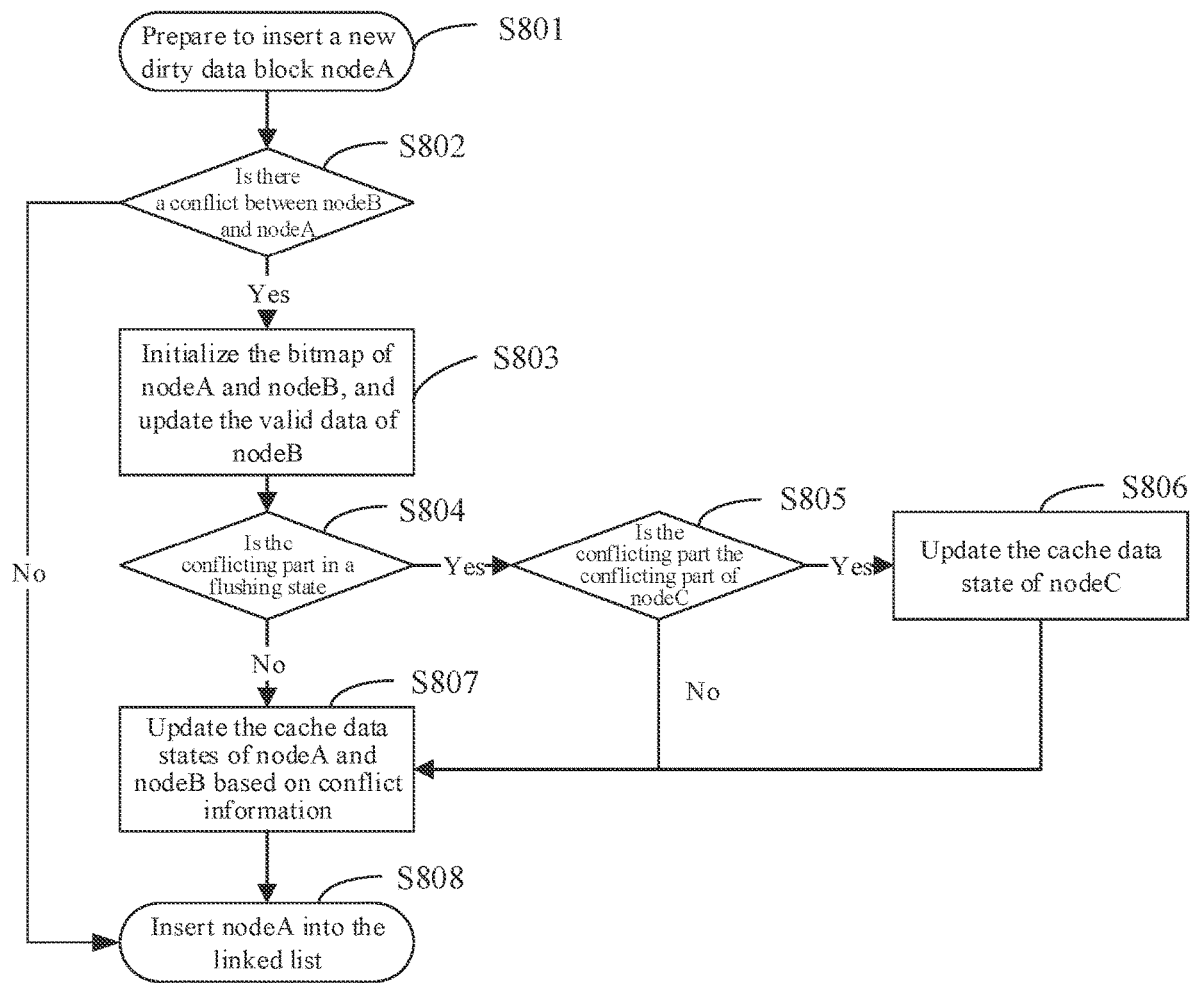
FIG. 8 is a flowchart showing the process of inserting the first dirty data block into a dirty data block linked list disclosed according to the embodiments of the present disclosure.

FIG. 8 is a flowchart showing the process of inserting the first dirty data block into a dirty data block linked list disclosed according to the embodiments of the present disclosure.

As shown in FIG. 8, the process of inserting the first dirty data block into the dirty data block linked list comprises:

S801: Prepare to insert a new dirty data block nodeA.

In some embodiments, when the solid state drive receives new write command data, it generates nodeA and records information such as data address ranges.

S802: Is there a conflict between nodeB and nodeA?

In some embodiments, when nodeA is inserted into the dirty data block linked list, it queries if there is a write conflict with other nodes on the dirty data block based on the address range. If no conflict exists, nodeA can be directly inserted into the linked list, and a flush entry is generated to prepare data for flushing, thus completing the cache update.

S803: Initialize the bitmap of nodeA and nodeB, and update the valid data of nodeB.

In some embodiments, if there is a conflict between nodeB and nodeA in the dirty data block linked list, initialize their respective bitmap collections based on the recorded address information of nodeB and nodeA; set the hasOldOverlap flag of nodeA to 1, indicating a conflict with an old node, and set the hasNewOverlap flag of nodeB to 1, indicating a conflict with a new node. As there is a data update in the conflicting part of nodeA, this portion of data in nodeB needs to be invalidated. Update the ValidBitmap of nodeB and clear the corresponding bits to 0.

S804: Is the conflicting part in a flushing state?

In some embodiments, it can be determined if the data in the conflicting part is in a flushing state based on the flush entry information of nodeB, wherein the flush entry information is generated from a bitmap. Bitmap identifies which data can be flushed, which data has already been flushed, and which data requires delayed flushing. This information can be found in the bitmap collection corresponding to nodeB, including the flushable data bitmap (DirtyBitmap), the valid data bitmap (ValidBitmap), the waiting-to-flush data bitmap (PendingBitmap), the sent flush data bitmap (SentBitmap), and the flush completion data bitmap (DoneBitmap).

S805: Is the conflicting part the conflicting part of nodeC?

In some embodiments, if the data in the conflicting part is currently being flushed, check if there is a conflict between nodeC and this portion of data. If nodeC contains a portion of data that is delayed for flushing, given that the data in nodeA is the most recent, this portion of data in nodeC becomes invalid. Clear the corresponding bits in the PendingBitmap of nodeC to 0 and set the corresponding bits in the PendingBitmap of nodeA to 1.

S806: Update the cache data state of nodeC.

S807: Update the cache data states of nodeA and nodeB based on conflict information.

In some embodiments, as the conflicting data in nodeB is currently being flushed, this portion of data in nodeA needs a delayed update. Update the PendingBitmap of nodeA and set the corresponding bits to 1. Update the DirtyBitmap of nodeB and clear the conflicting bits to 0. NodeB updates its flush entry based on the DirtyBitmap.

S808: Insert nodeA into the linked list.

In some embodiments, upon the completion of data flushing in the conflicting part and the data state updates of nodeA and nodeB, nodeA can be inserted into the dirty data block linked list. If the data in the conflicting part is not yet flushed, and the conflict handling is completed, nodeA can be inserted into the dirty data block linked list, thus completing the cache data update as well.

Figure 9:
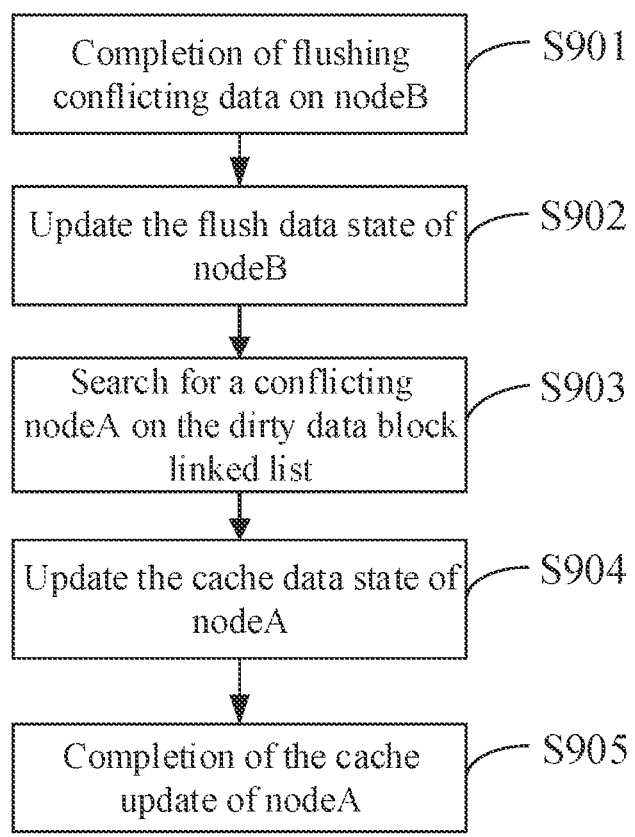
FIG. 9 is a flowchart showing the process of updating cache data in the first dirty data block disclosed according to the embodiments of the present disclosure.

FIG. 9 is a flowchart showing the process of updating cache data in the first dirty data block disclosed according to the embodiments of the present disclosure.

As shown in FIG. 9, the process of updating cache data in the first dirty data block comprises:

S901: Completion of flushing conflicting data on nodeB.

S902: Update the flush data state of nodeB.

In some embodiments, upon the completion of data flushing on nodeB, update the data completion state based on the flushed data, and set the corresponding bits in DoneBitmap to 1.

S903: Search for a conflicting nodeA on the dirty data block linked list.

In some embodiments, as the hasNewOverlap flag of nodeB is set to 1, a nodeA conflicting with nodeB can be found on the dirty data block linked list based on the data range of nodeB.

S904: Update the cache data state of nodeA.

In some embodiments, according to the data completion state DoneBitmap of nodeB and the waiting-to-flush data state PendingBitmap of nodeA, the data in nodeA that no longer needs to await flushing can be calculated and converted into flushable data, and the PendingBitmap/DirtyBitmap of nodeA is updated.

S905: Completion of the cache update of nodeA.

In some embodiments, when there is no data awaiting flushing in nodeA, i.e., PendingBitmap is 0, and there is no conflict during the cache of nodeA, the update of nodeA in the cache is completed.

In the embodiments of the present disclosure, a cache management method is provided which is applicable to a solid state drive. The solid state drive comprises a cache space, and the cache space comprises a dirty data block linked list. The method comprises: obtaining a write command and generating a first dirty data block, which is used to record data information of the write command; and if the first dirty data block conflicts in address range with a second dirty data block in the dirty data block linked list, marking the data in the conflicting region of the second dirty data block as invalid and inserting the first dirty data block into the dirty data block linked list. When the first dirty data block conflicts in address range with the second dirty data block in the dirty data block linked list, the data in the conflicting region of the second dirty data block is marked as invalid, and the first dirty data block is inserted into the dirty data block linked list. In this way, the present disclosure can separate cache insertion from data updates, allowing for rapid cache insertion, reducing command delay in write conflict scenarios, and enhancing the system performance of the solid state drive.

Embodiments of the present disclosure further provide a non-volatile computer storage medium that stores computer-executable instructions. The computer-executable instructions are executed by one or more processors, and for example, the aforementioned one or more processors can execute the cache management method in any one of the method embodiments mentioned above, such as executing the cache management method in any one of the method embodiments mentioned above, and executing each of the steps described above.

The apparatus and device embodiments described above are merely illustrative, wherein the unit modules described as separate components may or may not be physically separated, and components displayed as module units may or may not be physical units; i.e., they may be located in one position, or may be distributed on multiple network module units. Some or all of the modules can be selected according to actual needs to achieve the purpose of the schemes of the embodiments.

From the descriptions of the above embodiments, those skilled in the art can clearly understand that various embodiments can be implemented through a software and general hardware platform or through hardware alone. With this understanding, the essential parts or the parts contributing to the related art in the above technical solutions can be embodied in the form of a software product. This computer software product can be stored on computer-readable storage media such as ROM/RAM, magnetic disks, and optical disks, and may comprise several instructions for causing a computer device (which may be a personal computer, a server, or a network device, etc.) to perform to perform methods of various embodiments or portions thereof.

Finally, it should be noted that the above embodiments are only intended to illustrate the technical solutions of the present disclosure and are not intended to limit them. Within the concept of the present disclosure, the technical features in the above embodiments or different embodiments can also be combined, steps can be performed in any order, and many other variations in different aspects of the present disclosure may exist, which are not provided in detail for the sake of brevity. Despite the detailed description in reference to the previous embodiments, those of ordinary skill in the art should understand that the technical solutions described in the various embodiments can still be modified or some of the technical features therein can be replaced with equivalent alternatives. Such modifications or replacements do not take the essence of the respective technical solutions outside the scope of the various embodiments of the present disclosure.

The invention claimed is:

1. A method for cache management, applicable to a solid state drive, wherein the solid state drive comprises a cache space, the cache space comprises a dirty data block linked list, and the method comprises:
   obtaining a write command and generating a first dirty data block, wherein the first dirty data block is used to record data information of the write command;
   in response to the first dirty data block conflicting in an address range with a second dirty data block in the dirty data block linked list, determining whether data in a conflicting region of the second dirty data block is in a flushing state; and
   in response to the data in the conflicting region of the second dirty data block being in the flushing state, inserting the first dirty data block into the dirty data block linked list, and updating data states of the first dirty data block and the second dirty data block upon a completion of data flushing in the conflicting region of the second dirty data block.

2. The method according to claim 1, further comprising:
   in response to determining that the data in the conflicting region of the second dirty data block is not in the flushing state, marking the data in the conflicting region of the second dirty data block as invalid and inserting the first dirty data block into the dirty data block linked list.

3. The method according to claim 1, further comprising:
   in response to the data in the conflicting region of the second dirty data block being in the flushing state, determining if the data in the conflicting region of the second dirty data block is the same as data in a conflicting region of a third dirty data block in the dirty data block linked list;
   responsive to the data in the conflicting region of the second dirty data block being the same as the data in the conflicting region of the third dirty data block, marking the data in the conflicting region of the third dirty data block as invalid; and
   responsive to the data in the conflicting region of the second dirty data block being not the same as the data in the conflicting region of the third dirty data block, updating the data states of the first dirty data block and data states of the third dirty data block and inserting the first dirty data block into the dirty data block linked list.

4. The method according to claim 3, further comprising:
   generating a corresponding bitmap collection for each dirty data block, wherein the corresponding bitmap collection comprises:
   a flushable data bitmap used to identify data in the dirty data block that is flushed to a flash memory;
   a valid data bitmap used to identify valid data in the dirty data block;
   a waiting-to-flush data bitmap used to identify data in the dirty data block that is waiting to be flushed to the flash memory;
   a sent flush data bitmap used to identify data in the dirty data block that has been sent for flushing to the flash memory; and
   a flush completion data bitmap used to identify data in the dirty data block that has completed flushing.

5. The method according to claim 4, further comprising:
   before inserting the first dirty data block into the dirty data block linked list, setting data bits in the waiting-to-flush data bitmap of the first dirty data block corresponding to the data in the conflicting region of the second dirty data block to 1;
   wherein updating the data states of the first dirty data block and the second dirty data block upon the completion of data flushing in the conflicting region of the second dirty data block, comprises:
   setting data bits in the flush completion data bitmap of the second dirty data block corresponding to the data in the conflicting region of the second dirty data block to 1;
   setting data bits in the waiting-to-flush data bitmap of the first dirty data block corresponding to the data in the conflicting region of the second dirty data block to 0; and
   setting data bits in the flushable data bitmap of the first dirty data block corresponding to the data in the conflicting region of the second dirty data block to 1.

6. The method according to claim 4, wherein marking the data in the conflicting region of the second dirty data block as invalid comprises:
   setting data bits in the valid data bitmap of the second dirty data block corresponding to the data in the conflicting region of the second dirty data block to 0.

7. The method according to claim 4, wherein updating the data states of the first dirty data block and the data states of the third dirty data block comprises:
   setting data bits in the waiting-to-flush data bitmap of the third dirty data block corresponding to the data in the conflicting region of the third dirty data block to 0, and simultaneously setting data bits in the valid data bitmap of the third dirty data block corresponding to the data in the conflicting region of the third dirty data block to 0; and
   setting data bits in the waiting-to-flush data bitmap of the first dirty data block corresponding to the data in the conflicting region of the third dirty data block to 1.

8. The method according to claim 1, further comprising:
   generating a first conflict flag and a second conflict flag for each dirty data block, wherein the first conflict flag is used to mark whether the dirty data block conflicts in an address range with an old dirty data block, and the second conflict flag is used to mark whether the dirty data block conflicts in an address range with a new dirty data block; and in response to the first dirty data block conflicting in the address range with the second dirty data block in the dirty data block linked list, setting the first conflict flag corresponding to the first dirty data block to 1, and setting the second conflict flag corresponding to the second dirty data block to 1.

9. A solid state drive controller applicable to a solid state drive, wherein the solid state drive comprises at least one flash medium and a cache space, the cache space comprises a dirty data block linked list, and the solid state drive controller is configured to execute operations comprising:

obtaining a write command and generating a first dirty data block, wherein the first dirty data block is used to record data information of the write command;

in response to the first dirty data block conflicting in an address range with a second dirty data block in the dirty data block linked list, determining whether data in a conflicting region of the second dirty data block is in a flushing state; and in response to the data in the conflicting region of the second dirty data block being in the flushing state, inserting the first dirty data block into the dirty data block linked list, and updating data states of the first dirty data block and the second dirty data block upon a completion of data flushing in the conflicting region of the second dirty data block.

10. The solid state drive controller according to claim 9, wherein the operations further comprise:

in response to determining that the data in the conflicting region of the second dirty data block is not in the flushing state, marking the data in the conflicting region of the second dirty data block as invalid and inserting the first dirty data block into the dirty data block linked list.

11. The solid state drive controller according to claim 9, wherein the operations further comprise:

in response to the data in the conflicting region of the second dirty data block being in the flushing state, determining if the data in the conflicting region of the second dirty data block is the same as data in a conflicting region of a third dirty data block in the dirty data block linked list;

responsive to the data in the conflicting region of the second dirty data block being the same as the data in the conflicting region of the third dirty data block, if it is, marking the data in the conflicting region of the third dirty data block as invalid; and responsive to the data in the conflicting region of the second dirty data block being not the same as the data in the conflicting region of the third dirty data block, updating the data states of the first dirty data block and data states of the third dirty data block and inserting the first dirty data block into the dirty data block linked list.

12. The solid state drive controller according to claim 11, wherein the operations further comprise:

generating a corresponding bitmap collection for each dirty data block, wherein the corresponding bitmap collection comprises:

a flushable data bitmap used to identify data in the dirty data block that is flushed to a flash memory;

a valid data bitmap used to identify valid data in the dirty data block;

a waiting-to-flush data bitmap used to identify data in the dirty data block that is waiting to be flushed to the flash memory;

a sent flush data bitmap used to identify data in the dirty data block that has been sent for flushing to the flash memory; and a flush completion data bitmap used to identify data in the dirty data block that has completed flushing.

13. The solid state drive controller according to claim 12, wherein the operations further comprise:

before inserting the first dirty data block into the dirty data block linked list, setting data bits in the waiting-to-flush data bitmap of the first dirty data block corresponding to the data in the conflicting region of the second dirty data block to 1;

wherein updating the data states of the first dirty data block and the second dirty data block upon the completion of data flushing in the conflicting region of the second dirty data block, comprises:

setting data bits in the flush completion data bitmap of the second dirty data block corresponding to the data in the conflicting region of the second dirty data block to 1;

setting data bits in the waiting-to-flush data bitmap of the first dirty data block corresponding to the data in the conflicting region of the second dirty data block to 0; and setting data bits in the flushable data bitmap of the first dirty data block corresponding to the data in the conflicting region of the second dirty data block to 1.

14. The solid state drive controller according to claim 12, wherein marking the data in the conflicting region of the second dirty data block as invalid comprises:

setting data bits in the valid data bitmap of the second dirty data block corresponding to the data in the conflicting region of the second dirty data block to 0.

15. A solid state drive, comprising:
a cache space comprising a dirty data block linked list;
a solid state drive controller; and
at least one flash medium in communication connection with the solid state drive controller,
wherein the solid state drive controller is configured to execute operations comprising:

obtaining a write command and generating a first dirty data block, wherein the first dirty data block is used to record data information of the write command;

in response to the first dirty data block conflicting in an address range with a second dirty data block in the dirty data block linked list, determining whether data in a conflicting region of the second dirty data block is in a flushing state; and in response to the data in the conflicting region of the second dirty data block being in the flushing state, inserting the first dirty data block into the dirty data block linked list, and updating data states of the first dirty data block and the second dirty data block upon a completion of data flushing in the conflicting region of the second dirty data block.

16. The solid state drive according to claim 15, wherein the operations further comprise:

in response to determining that the data in the conflicting region of the second dirty data block is not in the flushing state, marking the data in the conflicting region of the second dirty data block as invalid and inserting the first dirty data block into the dirty data block linked list.

17. The solid state drive according to claim 15, wherein the operations further comprise:

in response to the data in the conflicting region of the second dirty data block being in the flushing state, determining if data in the conflicting region of the second dirty data block is the same as data in a conflicting region of a third dirty data block in the dirty data block linked list;

responsive to the data in the conflicting region of the second dirty data block being the same as the data in the conflicting region of the third dirty data block, marking the data in the conflicting region of the third dirty data block as invalid; and responsive to the data in the conflicting region of the second dirty data block being not the same as the data in the conflicting region of the third dirty data block, updating the data states of the first dirty data block and data states of the third dirty data block and inserting the first dirty data block into the dirty data block linked list.

18. The solid state drive according to claim 17, wherein the operations further comprise:

generating a corresponding bitmap collection for each dirty data block, wherein the corresponding bitmap collection comprises:

a flushable data bitmap used to identify data in the dirty data block that is flushed to a flash memory;

a valid data bitmap used to identify valid data in the dirty data block;

a waiting-to-flush data bitmap used to identify data in the dirty data block that is waiting to be flushed to the flash memory;

a sent flush data bitmap used to identify data in the dirty data block that has been sent for flushing to the flash memory; and a flush completion data bitmap used to identify data in the dirty data block that has completed flushing.

19. The solid state drive according to claim 18, wherein the operations further comprise:

before inserting the first dirty data block into the dirty data block linked list, setting data bits in the waiting-to-flush data bitmap of the first dirty data block corresponding to the data in the conflicting region of the second dirty data block to 1;

wherein updating the data states of the first dirty data block and the second dirty data block upon the completion of data flushing in the conflicting region of the second dirty data block, comprises:

setting data bits in the flush completion data bitmap of the second dirty data block corresponding to the data in the conflicting region of the second dirty data block to 1;

setting data bits in the waiting-to-flush data bitmap of the first dirty data block corresponding to the data in the conflicting region of the second dirty data block to 0; and setting data bits in the flushable data bitmap of the first dirty data block corresponding to the data in the conflicting region of the second dirty data block to 1.

20. The solid state drive according to claim 18, wherein marking the data in the conflicting region of the second dirty data block as invalid comprises:

setting data bits in the valid data bitmap of the second dirty data block corresponding to the data in the conflicting region of the second dirty data block to 0.

* * * * *